United States Patent [19]

Heath

[11] 3,973,766

[45] Aug. 10, 1976

[54] MODEL AIRCRAFT WING CONSTRUCTION JIG

[76] Inventor: Vernon Ernest Heath, 28 Springfield Road, Walmley, Sutton Coldfield, West Midlands, England

[22] Filed: June 24, 1975

[21] Appl. No.: 589,823

[30] Foreign Application Priority Data

Mar. 27, 1975 United Kingdom .............. 13124/75

[52] U.S. Cl. .................................... 269/43; 269/47; 269/321 W; 29/241

[51] Int. Cl.² .......................................... B23P 19/04

[58] Field of Search ................... 269/37, 40, 43, 47, 269/99, 246, 321 W; 29/200 J, 200 P, 241, 433

[56] References Cited

UNITED STATES PATENTS

| | | | |
|---|---|---|---|
| 1,271,386 | 7/1918 | Tarbox | 269/40 |
| 3,403,900 | 10/1968 | Turro | 269/37 |
| 3,908,976 | 9/1975 | Petrinec | 269/32 W |

FOREIGN PATENTS OR APPLICATIONS

| | | | |
|---|---|---|---|
| 1,102,847 | 3/1961 | Germany | 269/246 |

*Primary Examiner*—Al Lawrence Smith
*Assistant Examiner*—Robert C. Watson
*Attorney, Agent, or Firm*—John C. Smith, Jr.

[57] ABSTRACT

A model aircraft wing construction jig comprises an elongate front assembly rail, a wing rib carrier rod, and a pair of end clamp members which all assemble together to form a jig structure wherein the front assembly rail and wing rib carrier rod extend, in adjustable spaced-apart relationship, between the end clamp members. The front assembly rail has longitudinally-extending jaws to hold therebetween a flat strip of wood with one longitudinal edge portion of said strip forming a tongue protruding from one side of the assembly rail to engage notches in the leading end edges of the wing rib components threadably mounted on the wing rib carrier rod which inserts through accurately located holes preformed in the body of said rib components.

6 Claims, 6 Drawing Figures

MODEL AIRCRAFT WING CONSTRUCTION JIG

This invention relates to a model aircraft wing construction jig for use in the building of wings of model aircraft, the term "wings" being used herein to include "wing panels" of which two or more may be used to form a complete wing structure.

The wings of model aircraft, especially "flying" models such as radio-controlled models for powered flight for example, are commonly fabricated as a framework built up from transverse ribs and longitudinally extending spars and edging strips, composed usually of balsa wood, lightweight plywood or the like, glued or adhesively bonded together, the framework finally being covered with suitable sheeting material. Construction is generally carried out on the basis of a full-scale detail plan or drawing, and a high degree of accuracy and precision is required to obtain satisfactory results so that some form of jig is often desirable for reducing the skill and time-consuming labour otherwise necessary in shaping and assembling the components and for holding the assembly whilst the components are bonded or glued together in their proper relative positions and whilst other subsequent operations are carried out.

Wing shapes and detailed constructions vary considerably, however, for models of different types of aircraft, and in general wing jigs hitherto proposed have been subject to various limitations and have not been as versatile as may be desired.

One object of the present invention is accordingly to provide an improved form of model aircraft wing construction jig which can be easy to use, simple and economical to produce, and which can be highly adaptable to suit many different forms of wings.

More specifically, the invention provides a model aircraft wing construction jig comprising an elongate front assembly rail, a wing rib carrier rod, and a pair of end clamp members which assemble together to form a jig structure in which the front assembly rail and rib carrier rod are disposed in spaced-apart relationship both extending, in directions mutually co-planar, between the end clamp members, said end clamp members engaging and holding respective end portions of said front assembly rail and rib carrier rod and being adjustable to enable said end portions to be held in different positions and permit the relative angular relationship between the front assembly rail and rib carrier rod to be varied, said front assembly rail having a pair of longitudinally-extending jaws adapted to hold therebetween a flat strip of wood with one longitudinal edge portion of said strip forming a tongue protruding from one side of the front assembly rail towards the rib carrier rod, whereby in building a wing, rib components thereof which are preformed with an accurately located hole in their body and with a notch in their leading end edge can be threadably mounted on said rib carrier rod and be moved individually into their correct relative positions in which the notch in their leading edge is engaged with the protruding tongue of the flat wood strip held by the front assembly rail. After so assembling the rib components, various further profiling and finishing operations can then readily be carried out including the glueing or bonding of the ribs to interconnecting longitudinally-extending strips or spars to form a unitary framework structure followed by final covering thereof with sheeting material. In this assembly method, the front assembly rail sets the line of the leading edge of the wing and the protruding tongue may finally be severed, by a cutting knife for example, from the remainder of the flat wood strip when the wing is to be removed from the jig so that it is permanently incorporated in the leading edge structure of the wing.

Preferably, in building a wing the jaws of the front assembly rail hold the flat wood strip so that the protruding tongue projects perpendicularly to longitudinal side face portions of said rail providing abutments against which can be positioned facing strips for engaging and connecting together the leading end edges of the ribs, these facing strips also finally forming part of the leading edge structure of the wing together with the severed tongue. The above-mentioned longitudinal side face portions are conveniently formed by the side edge surfaces of rectangular-section metal strips forming clamping pads interposed between opposite relatively-movable jaw blocks mounted on a jaw support bar fitted with compressor means for releasably clamping the jaws together.

In preferred embodiments, the jig end clamp members each comprise a pair of jaws providing opposed planar clamping face portions adapted to receive therebetween and to hold, in spaced apart positions, the respective end portions of the front assembly rail and rib carrier rod.

The jaws are conveniently formed by elongate jaw blocks connected together by adjustable screw clamping means, preferably centrally disposed, to control the spacing and clamping pressure therebetween. And surfaces of the jaw blocks providing the opposed planar clamping face portions may be stepped or otherwise profiled so as, in use, to accommodate differences in the cross-sectional dimensions of the end portions of the front assembly rail and of the rib carrier rod and thus maintain said opposed planar clamping face portions in substantially parallel relationship, thereby readily permitting a range of sideways displacement of said end portions, upon slackening slightly the screw clamping means, to facilitate adjustment of the spacing and relative angular relationship between the ends of the front assembly rail and rib carrier rod.

The jaw blocks are also advantageously designed and profiled so as to provide stable free-standing support for the assembled jig structure in a variety of different positions, and they may be adapted to be located and secured, if desired, to a supporting base.

The invention also includes a method of constructing a model aircraft wing using a jig of the form hereinabove defined.

By way of example, one form of model aircraft wing construction jig in accordance with the invention is illustrated in the accompanying drawings wherein.

Figure 1:
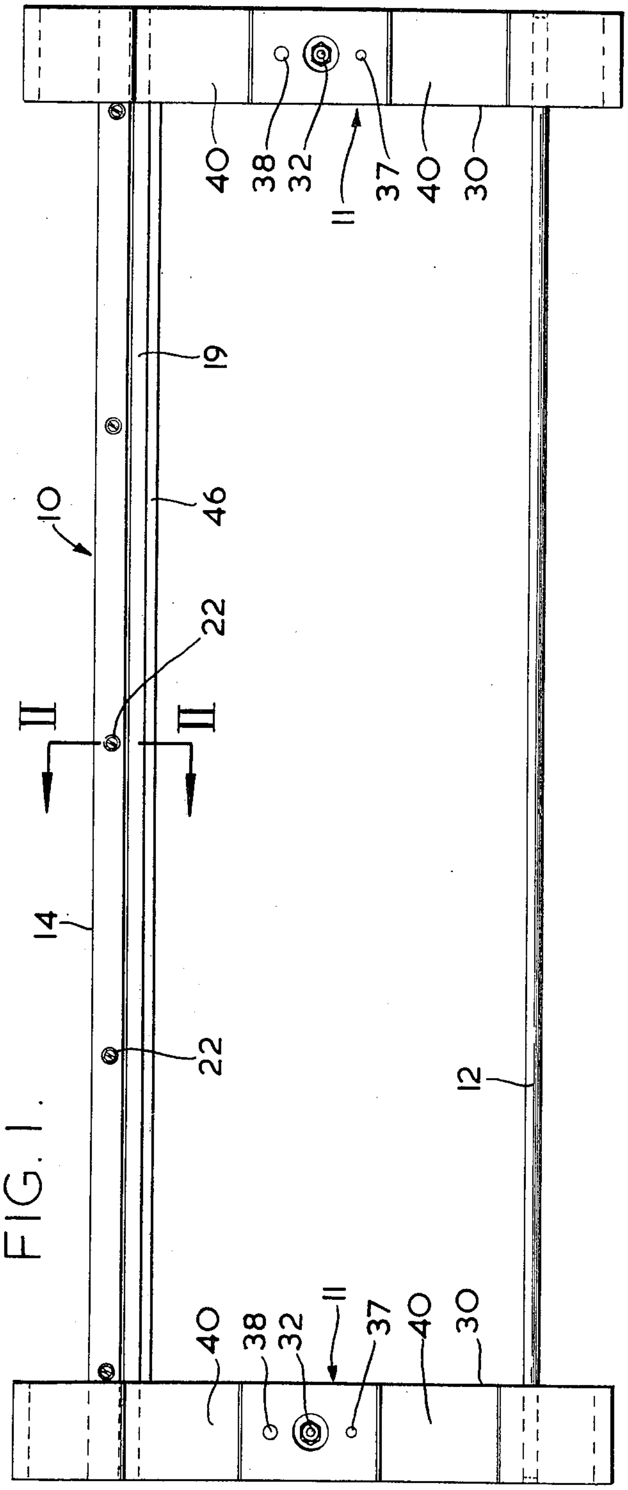
FIG. 1 is a plan view of the assembled jig.
Figure 3:
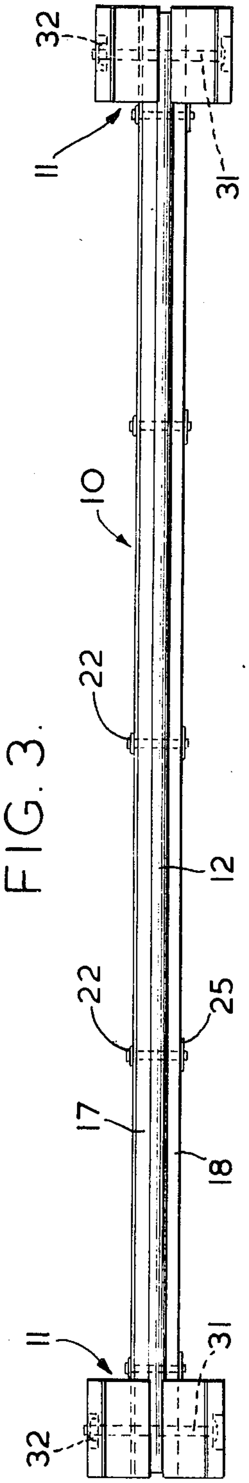
FIG. 3 is a rear elevational view.
Figure 4:
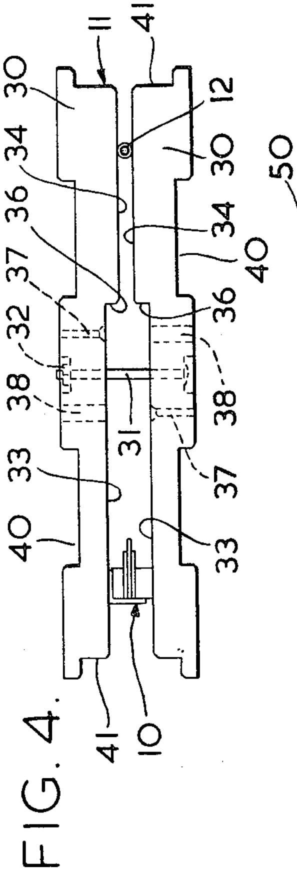
FIG. 4 is an end elevational view.

Referring to the drawings, the jig illustrated therein comprises a front assembly rail 10, a pair of end clamp members 11, 11, and a wing rib carrier rod 12.

Figure 2:
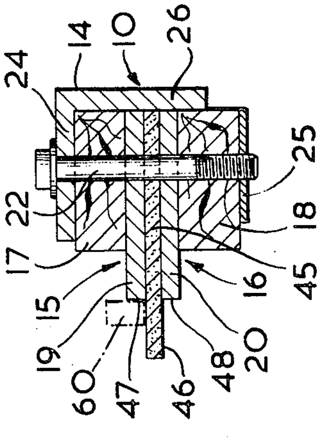
FIG. 2 is a cross-sectional view on line II—II of FIG. 1.

As shown, the front assembly rail 10 has a composite structure made up of an L-section angle bar 14, formed of metal such as aluminium for example, which supports a pair of jaws 15, 16, composed of hardwood jaw blocks 17, 18, and rectangular section strips, also formed of aluminium or the like, providing top and bottom clamping pads 19, 20. The assembly rail 10 also includes a number of spaced apart compressors for releasably clamping together the jaws 15, 16, each compressor comprising a screw 22 which passes through a hole in the top limb 24 of the support bar 14 and through aligned holes in the jaw blocks 17, 18, and clamping pads 19, 20, the bottom end of the screw being fitted with a blind clamping nut 25, as indicated in FIG. 2. The side limb 26 of the support bar 14 provides a guide surface for the jaws 15, 16, during movement and adjustment thereof.

The wing rib carrier rod 12 is in the form of a cylindrical tube, ⅜ inch outside diameter for example, and each end clamp member 11 comprises a pair of elongate jaw blocks 30, 30, formed conveniently of hardwood, which are connected by a centrally disposed coach bolt 31 and clamping nut 32 and which provide opposed planar clamping face portions 33, 33, and 34, 34.

When the jig is assembled, the front assembly rail 10 and rib carrier rod 12 are arranged in spaced relationship extending in directions mutually co-planar with their end portions received and held between the clamping face portions 33, 33, and 34, 34, of the respective end clamp members 11, 11, which extend transversely between the adjacent pairs of end portions as shown. A step 36 between the clamping face portions 33 and 34 of each jaw block 30 enables the difference in thickness of the front assembly rail 10 and of the rib carrier rod 12 to be accommodated whilst maintaining a substantially parallel relationship between the opposing pairs of faces 33, 33, and 34, 34, of each end clamp membeer so that before finally tightening the clamping nut 32 the end portions of the front assembly rail and rib carrier rod can be shifted sideways to adjust the spacing and relative angular relationship of rail 10 and rod 12 to suit and conform to the profile of the wing to be constructed.

Holes 37 and 38 in the jaw blocks 30 enable securing screws to be fitted to fix the jig to a baseboard or other support, if desired, and the exterior surfaces of the jaw blocks 30 are profiled to provide projecting feet portions spaced apart by rectangular recesses 40, 41, which may in some circumstances be useful for locating purposes and which provide stable free-standing support for the assembled jig structure in a variety of different positions.

In using the jig, a flat rectangular strip of wood 45, formed with holes as necessary to accommodate the screws 22, is first fitted between the metal clamping pads 19, 20, of the jaws 15, 16, of the front assembly rail 10 so as to leave one longitudinal edge portion of said strip forming a protruding tongue 46 which projects perpendicular to the longitudinal side face portions 47, 48, of the pads 19, 20, as shown most clearly in FIG. 2.

Figure 5:
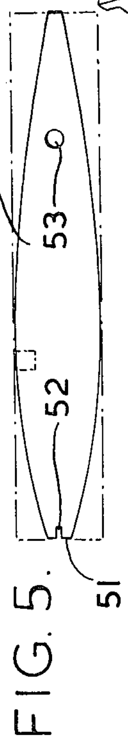
FIG. 5 shows a typical profile of a wing rib component used in building a wing in the jig.

The required wing ribs, substantially of aerofoil section, are then cut, out of balsa wood or lightweight plywood for example, as indicated at 50 in FIG. 5, the leading end edge 51 being squared-off and provided with a square-cut notch 52 aligned with the central chord of the rib. And, towards the trailing end, the body of each rib 50 is formed with a circular hole 53 of a diameter matching that of the carrier rod 12. This hole 53 is conveniently formed by a circular punch in a predetermined positions which may be accurately located by means of a simple template made for the purpose, this template having a V-groove to position the punch.

The wing ribs 50 are then threaded on to the carrier rod 12 which is a sliding fit in their holes 53, and the jig is assembled as hereinbefore described with the end clamp members 11, 11, spaced apart at a sufficient distance to accommodate therebetween the desired length of wing to be constructed. A front or leading edge upper facing strip may then be laid on the protruding tongue 46 in abutting relationship with the side face portion 47 of clamping pad 19, as indicated in broken lines at 60 in FIG. 2, and the wing ribs 50 are moved individually to their correct relative positions, spaced at intervals along the rod 12, their leading ends being offered up to the front assembly rail so that the protruding tongue 46 engages in the notch 52 and the leading end edge 51 butts against the facing strip 60.

Figure 6:
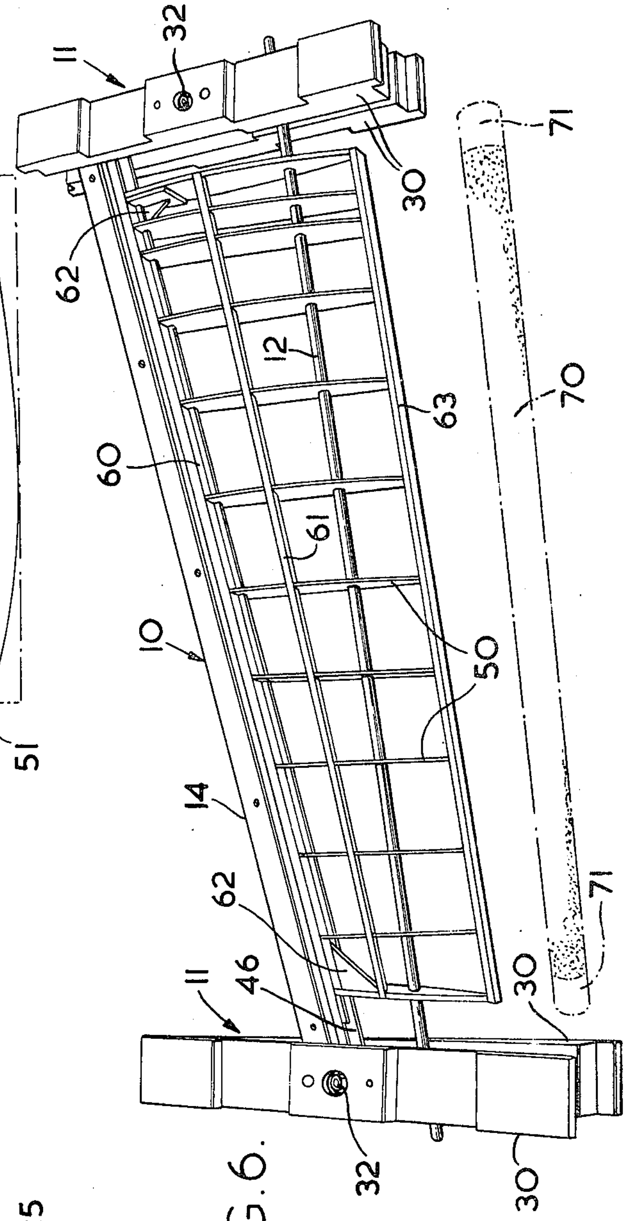
FIG. 6 is a perspective view showing the jig in use.

Then, the wing framework can be completed, as indicated in FIG. 6 for example, by adding at least one longitudinally extending main spar 61 fitted into further notches in the wing ribs 50, gusset pieces 62, a trailing edge strip or spar 63 and such other framework elements, including a front or leading edge lower facing strip to match the upper strip 60, as are required, the component elements all being glued or otherwise adhesively bonded to one another as necessary to produce a strong unitary structure. And, after any further sanding and similar profiling or other operations needed, sheeting material may then be applied to cover the framework of the wing, after which the wing can be separated from the front assembly rail 10 by using a thin knife or cutting blade, inserted along the side face portion 47 of clamping pad 19, to sever the protruding tongue 46, and the clamping nuts 32 of the end clamp members 11, 11, are slackened to release the front assembly rail 10 and carrier rod 12 and permit the wing to be slidably withdrawn off the latter. Then, finally, the square leading edge face which is produced by the above-described manner of construction can be profiled or capped as desired, wing·tips may be added, and any other finishing operations completed.

Use of this jig can facilitate the profiling of the wing ribs in that, initially, only the two ribs which are to be located in the endmost positions need be cut and preformed accurately to size, whilst the intermediate ribs are more roughly cut slightly oversize in depth. Then, after positioning all the ribs correctly in the jig, an accurate straight sanding stick of appropriate length with plain smooth surfaced end portions flush with the intermediate abrasive surface can be used to sand down and accurately profile all the intermediate ribs, the sanding stick being laid longitudinally so as to span over all the ribs and being stroked back and forth until the plain end portions contact the edges of the endmost ribs over their entire length. Such sanding stick is indicated diagrammatically in broken lines at 70 in FIG. 6, references 71, 71 representing the plain end portions.

As previously indicated, the jig can be handled as a unit and can be set in various positions during construction of the wing, or it can be secured to a bench, baseboard or other underlying support surface.

It will be appreciated that the jig described is very versatile and can be set or adapted for use in constructing many different designs and types of wings, including tapering wings, parallel chord wings and swept wings. Various modifications in the precise constructional details of the above-described embodiment can, however, be made, if desired, within the scope of the invention.

I claim:

1. A model aircraft wing construction jig comprising:

a. an elongate front assembly rail having a pair of longitudinally-extending jaws and means for clampingly adjusting said jaws so as, in use, to hold therebetween a flat strip of wood with one longitudinal edge portion of said strip forming a tongue extending along the length of said front assembly rail and protruding from one side thereof;

b. a wing rib carrier rod forming a guide and support for threadably mounting thereon wing rib components preformed with an accurately located mounting hole in their body;

c. a pair of end clamp members having a pair of opposed jaws and adjustable clamping means connecting together said jaws;

d. the end clamp members being adapted to engage and hold between their said jaws respective end portions of said front assembly rail and of said wing rib carrier rod so as to form an assembled jig structure in which the front assembly rail and wing rib carrier rod are disposed in spaced-apart relationship both extending, in directions mutually co-planar, between the end clamp members which are controllable, by said adjustable clamping means, to enable said end portions to be held in different positions so as to permit the relative angular relationship between the front assembly rail and wing rib carrier rod in the made-up jig structure to be varied and set to conform to the required wing shape, whereby in use in building a wing, the rib components thereof, preformed with the accurately located hole in their body and formed also with a notch in their leading end edges, can be moved, after threadably mounting on said rib carrier rod and after assembling and setting the jig structure, into their correct relative positions wherein they are located by engagement of the notch in their leading edges with the protruding tongue of the flat wood strip held by the front assembly rail.

2. A model aircraft wing construction jig according to claim 1, wherein the jaws of the front assembly rail comprise opposite relatively-movable jaws blocks and a pair of metal strips constituting clamping pads interposed between said jaw blocks, said metal strips having side edge surfaces defining longitudinal side face portions of the front assembly rail which provide abutments along said one side thereof for locating wing leading edge facing strips for engaging and connecting together the leading end edges of the wing rib components.

3. A model aircraft wing construction jig according to claim 2, wherein the front assembly rail further comprises a jaw support bar upon which said jaw blocks are mounted and compressor means fitted to said jaw support bar for releasably clamping the jaws together.

4. A model aircraft wing construction jig according to claim 1, wherein the jig end clamp members each comprise a pair of jaws having opposed planar clamping face portions adapted to receive therebetween and to hold, in spaced apart positions, the respective end portions of the front assembly rail and rib carrier rod, said jaws comprising elongate jaw blocks and adjustable screw clamping means centrally disposed connecting together said jaw blocks to control the spacing and clamping pressure therebetween.

5. A model aircraft wing construction jig according to claim 4, wherein the jaw blocks each have profiled surfaces providing first and second planar clamping face portions disposed at different levels so as, in use, to accommodate differences in the cross-sectional dimensions of the end portions of the front assembly rail and of the rib carrier rod whilst maintaining said opposed planar clamping face portions in substantially parallel relationship.

6. A model aircraft wing construction jig according to claim 4, wherein the jaw blocks have a plurality of feet portions projecting in different orientations so as to provide stable free-standing support for the assembled jig structure in a variety of different positions.

* * * * *